(12) United States Patent
Stuart et al.

(10) Patent No.: US 10,678,290 B2
(45) Date of Patent: Jun. 9, 2020

(54) NON-HYDRAULIC, INTEGRATED DAMPING MECHANISM IN AN ELECTRONIC CONTROLLER ASSEMBLY

(71) Applicant: Williams Controls, Inc., Portland, OR (US)

(72) Inventors: Colt Kincade Stuart, Lake Oswego, OR (US); Joseph A. Vasicek, Tigard, OR (US); Kenneth Randall Barton, Portland, OR (US)

(73) Assignee: WILLIAMS CONTROLS, INC., Portland, OR (US)

( * ) Notice: Subject to any disclaimer, the term of this patent is extended or adjusted under 35 U.S.C. 154(b) by 167 days.

(21) Appl. No.: 15/910,466

(22) Filed: Mar. 2, 2018

(65) Prior Publication Data

US 2018/0253121 A1    Sep. 6, 2018

Related U.S. Application Data

(60) Provisional application No. 62/466,718, filed on Mar. 3, 2017.

(51) Int. Cl.
*G05G 5/05* (2006.01)
*G05G 1/44* (2008.04)
(Continued)

(52) U.S. Cl.
CPC ............. *G05G 5/05* (2013.01); *F16F 13/007* (2013.01); *G05G 1/38* (2013.01); *G05G 1/44* (2013.01);
(Continued)

(58) Field of Classification Search
CPC ............ G05G 1/44; G05G 1/445; G05G 5/05; G05G 1/38; F16F 13/007
See application file for complete search history.

(56) References Cited

U.S. PATENT DOCUMENTS

| 2,482,550 A | * | 9/1949 | Koertge | ................. | H01H 21/26 |
| | | | | | 200/86 R |
| 5,518,223 A | * | 5/1996 | Bivens | .................. | F16F 9/0254 |
| | | | | | 16/66 |

(Continued)

FOREIGN PATENT DOCUMENTS

| CH | 690 909 A5 | 2/2001 |
| GB | 640229 | 7/1950 |

OTHER PUBLICATIONS

International Search Report dated Jun. 21, 2018 for corresponding International Application No. PCT/US2018/020632.

(Continued)

*Primary Examiner* — Thomas C Diaz
(74) *Attorney, Agent, or Firm* — Pearne & Gordon LLP

(57) ABSTRACT

A dampened electronic control for manual operation to control a machine includes a housing, a movable element pivotally supported in the housing upon a shaft with a rotation axis, and an electronic sensor configured to detect rotational movement of the shaft. A non-hydraulic damping mechanism is coupled to the moveable element, wherein the damping mechanism includes a piston disposed in a cylinder of the housing and configured to operate with air inside the cylinder as the working fluid and a spring to resiliently bias the piston towards the moveable element. Movement of the moveable element towards the piston causes the piston to compress the air inside the cylinder to thereby provide a resistance force against the moveable element to thereby dampen the movement of the moveable element.

18 Claims, 8 Drawing Sheets

(51) Int. Cl.
*F16F 13/00* (2006.01)
*G05G 1/38* (2008.04)
*G05G 1/445* (2008.04)

(52) U.S. Cl.
CPC ............ *G05G 1/445* (2013.01); *F16F 13/002* (2013.01); *F16F 2222/126* (2013.01); *F16F 2236/04* (2013.01)

(56) References Cited

U.S. PATENT DOCUMENTS

| | | | |
|---|---|---|---|
| 5,576,704 A | 11/1996 | Baker et al. | |
| 5,599,255 A | 2/1997 | Ki-Dong et al. | |
| 6,109,133 A * | 8/2000 | Kohlen | B60K 26/021 |
| | | | 188/74 |
| 6,327,931 B1 | 12/2001 | Skogward | |
| 6,931,962 B2 * | 8/2005 | Maurer | G05G 1/30 |
| | | | 74/491 |
| 7,347,510 B2 * | 3/2008 | Schluter | B60T 7/042 |
| | | | 303/114.1 |
| 7,425,042 B2 * | 9/2008 | Fujiwara | B60T 7/042 |
| | | | 303/114.1 |
| 8,930,106 B2 | 1/2015 | Mitsuyasu et al. | |
| 2002/0178854 A1 | 12/2002 | Weber et al. | |
| 2010/0089197 A1 | 4/2010 | Schramm | |

OTHER PUBLICATIONS

Written Opinion dated Jun. 21, 2018 for corresponding International Application No. PCT/US2018/020632.

* cited by examiner

NON-HYDRAULIC, INTEGRATED DAMPING MECHANISM IN AN ELECTRONIC CONTROLLER ASSEMBLY

CROSS-REFERENCE TO RELATED APPLICATIONS

This application claims the benefit of U.S. Provisional Application No. 62/466718, filed Mar. 3, 2017, the entire disclosure of which is hereby incorporated herein by reference.

FIELD OF THE INVENTION

The present application relates generally to dampened controls, particularly those that are used in heavy industrial vehicles such as excavators. Integrated dampers are used for accelerator or brake pedals operated by foot controls, but more generically can also be implemented as part of joysticks or other hand controls.

BACKGROUND OF THE INVENTION

It is important for controls in heavy industrial applications to be resistant to unintentional operation. Unintentional operation could be caused from traveling across rough surfaces, from momentary shocks due to impacts on the vehicle chassis or a sudden release of force on a vehicle attachment arm, or from sudden release of the control by the operator.

Conventionally, dampened controls are provided as part of conventional hydraulic control systems. Often, the hydraulic system itself, by the nature of hydraulic fluids, provided some inherent damping.

U.S. Publication No. 2010/0089197 A1 discloses a conventional dampened control, which is operated by moving a spring-supported surface, or treadle, using the operator's foot.

U.S. Pat. No. 6,931,962 B2 discloses another conventional controller. This controller utilizes internal controls and hydraulics to regulate the operator force and limit the speed of depression.

Gradually, hydraulic controls are being replaced with electronic controls. Current methods of dampening electronic pedals use modules which are bolted directly onto the control assembly. These electronic control modules typically utilize stacked Bellville washer disk springs or a fluid filled chamber with a sliding piston.

BRIEF SUMMARY OF THE INVENTION

The following presents a simplified summary of example embodiments of the invention. This summary is not intended to identify critical elements or to delineate the scope of the invention.

In accordance with one aspect, a dampened electronic control for manual operation to control a machine includes a housing, a movable element pivotally supported in the housing upon a shaft with a rotation axis, and an electronic sensor configured to detect rotational movement of the shaft. A non-hydraulic damping mechanism is coupled to the moveable element, wherein the damping mechanism includes a piston disposed in a cylinder of the housing and configured to operate with air inside the cylinder as the working fluid and a spring to resiliently bias the piston towards the moveable element. Movement of the moveable element towards the piston causes the piston to compress the air inside the cylinder to thereby provide a resistance force against the moveable element to thereby dampen the movement of the moveable element.

In another aspect, the moveable element comprises a treadle.

In another aspect, the sensor comprises a Hall effect sensor.

In another aspect, the damping mechanism comprises a pair of pistons, with each of the pair of pistons being located on opposite sides of the shaft.

In another aspect, each of the pair of pistons are configured to impart substantially equal and opposite forces upon the moveable element to thereby bias the moveable element towards a neutral position.

In another aspect, each of the pair of pistons is separately provided with said spring, and each piston is resiliently biased towards the moveable element equally on opposite sides of the shaft.

In another aspect, the piston is provided with an aperture that is slidably connected to a peg provided on the moveable element so that a rotation of the moveable element about the rotation axis of shaft results in a vertical movement of the piston within the cylinder.

In another aspect, an inner surface of the piston comprises a circular ridge or groove to engage and retain a top portion of the spring.

In another aspect, the piston comprises at least one sealing ring that slidably engages the inner walls of the cylinder.

In another aspect, the piston comprises a bore hole extending completely through the piston to provide fluid communication between air contained within the cylinder and an exterior environment outside the housing.

In accordance with a second aspect, a dampened electronic control is provided for manual operation to control a machine. The dampened electronic control comprises a housing, a movable element pivotally supported in the housing upon a shaft with a rotation axis, an electronic sensor configured to detect rotational movement of the shaft, and a non-hydraulic damping mechanism coupled to the moveable element. The damping mechanism comprises first and second pistons located on opposite sides of the shaft, each piston being disposed within first and second cylinders, respectively, of the housing and configured to operate with air inside the cylinder as the working fluid. A moveable connection is provided between each piston and the moveable element so that a rotation of the moveable element about the rotation axis of shaft results in a vertical movement of each piston within the respective cylinder. A spring is provided to each piston and adapted to resiliently bias said piston towards the moveable element. Movement of the moveable element towards the first piston causes said first piston to compress the air inside the first cylinder to thereby provide a resistance force against the moveable element to thereby dampen the movement of the moveable element.

In another aspect, movement of the moveable element away from the second piston causes said second piston to expand the air inside the second cylinder.

In another aspect, the first and second pistons are located on opposite sides of the shaft and are equidistant from the shaft.

In another aspect, a plurality of springs is provided separately to each of the first and second pistons, wherein the springs impart substantially equal and opposite forces upon the moveable element to thereby bias the moveable element towards a neutral position.

In another aspect, the moveable element comprises a treadle.

In another aspect, each of the first and second pistons comprises at least one sealing ring that slidably engages the inner walls of the first and second cylinders, respectively.

In another aspect, moveable connection of the first and second pistons comprises an aperture that is slidably connected to a peg provided on the moveable element so that a rotation of the moveable element about the rotation axis of shaft results in a vertical movement of the first and second pistons within the first and second pistons, respectively.

In another aspect, each of the first and second pistons comprises a bore hole extending completely through the respective piston to provide fluid communication between air contained within the first and second cylinders and an exterior environment outside the housing.

In another aspect, a neutral detent mechanism that actively moves the movable element back towards a neutral position, wherein the neutral detent mechanism comprises a mechanism body secured to the housing and a cam plate secured to the movable element.

In another aspect, the mechanism body comprises a spring-biased cam follower pin that is received and seated in a concave cam surface of the cam plate, whereby as the cam plate rotates together with the moveable element, the cam follower pin is dislodged from the concave cam surface by a cam action face that engages with and presses upon the cam follower pin in opposition to a force applied by the spring of the cam follower pin.

It is to be understood that both the foregoing general description and the following detailed description present example and explanatory embodiments. The accompanying drawings are included to provide a further understanding of the described embodiments and are incorporated into and constitute a part of this specification. The drawings illustrate various example embodiments of the invention.

BRIEF DESCRIPTION OF THE DRAWINGS

Aspects of the present invention will become apparent to those skilled in the art upon reading the following description with reference to the accompanying drawings, in which.

DESCRIPTION OF EXAMPLE EMBODIMENTS

Figure 1:
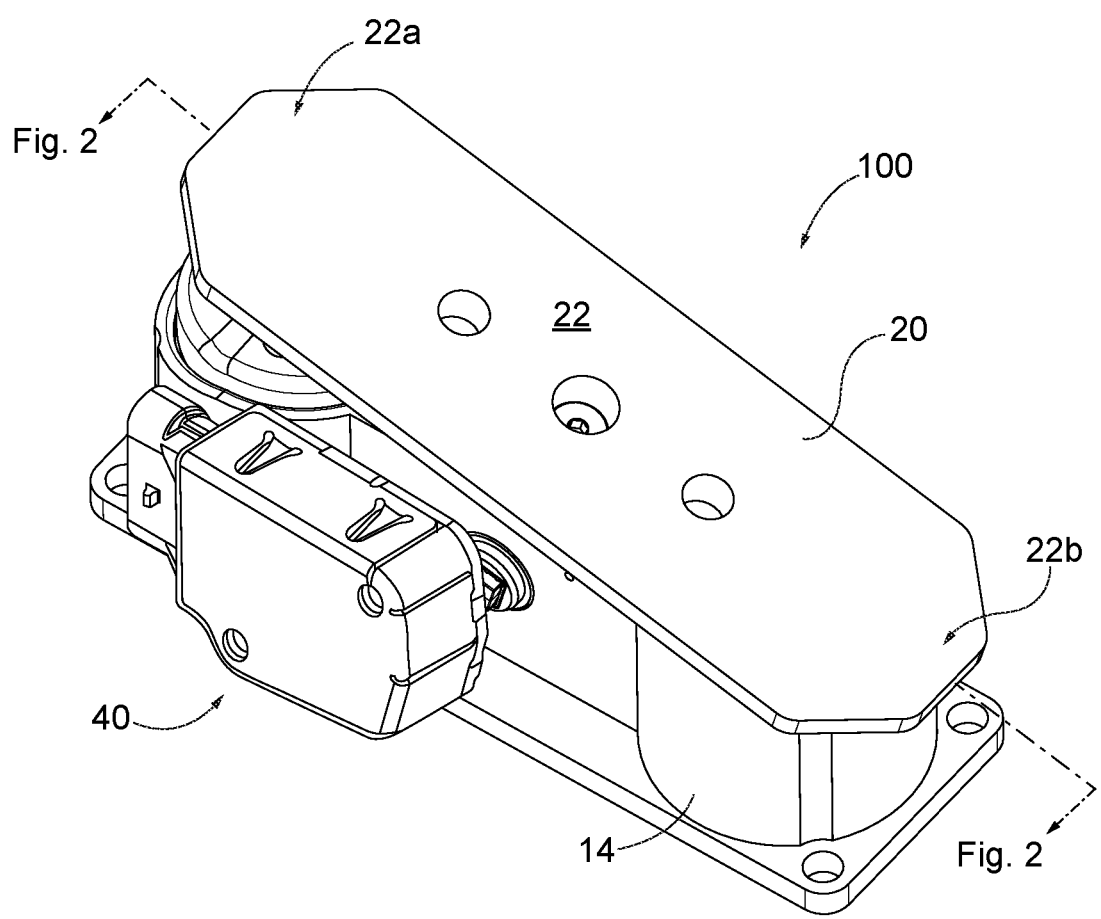
FIG. 1 is a perspective, front view of a non-hydraulic damping mechanism integrated in an electronic controller assembly, with the mechanism in an actuated position.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

In the following description, where a vehicle is referred to, it is noted that the controller does not necessarily need to be used to operate a vehicle, and may instead be used to operate various features on a non-motive device, a simulator, a gaming console, or other non-vehicular application that is based on one or more control signals inputted by an operator. In these cases, 'vehicle' should be construed as the application which makes use of the control signal produced by the control assembly.

Figure 2:
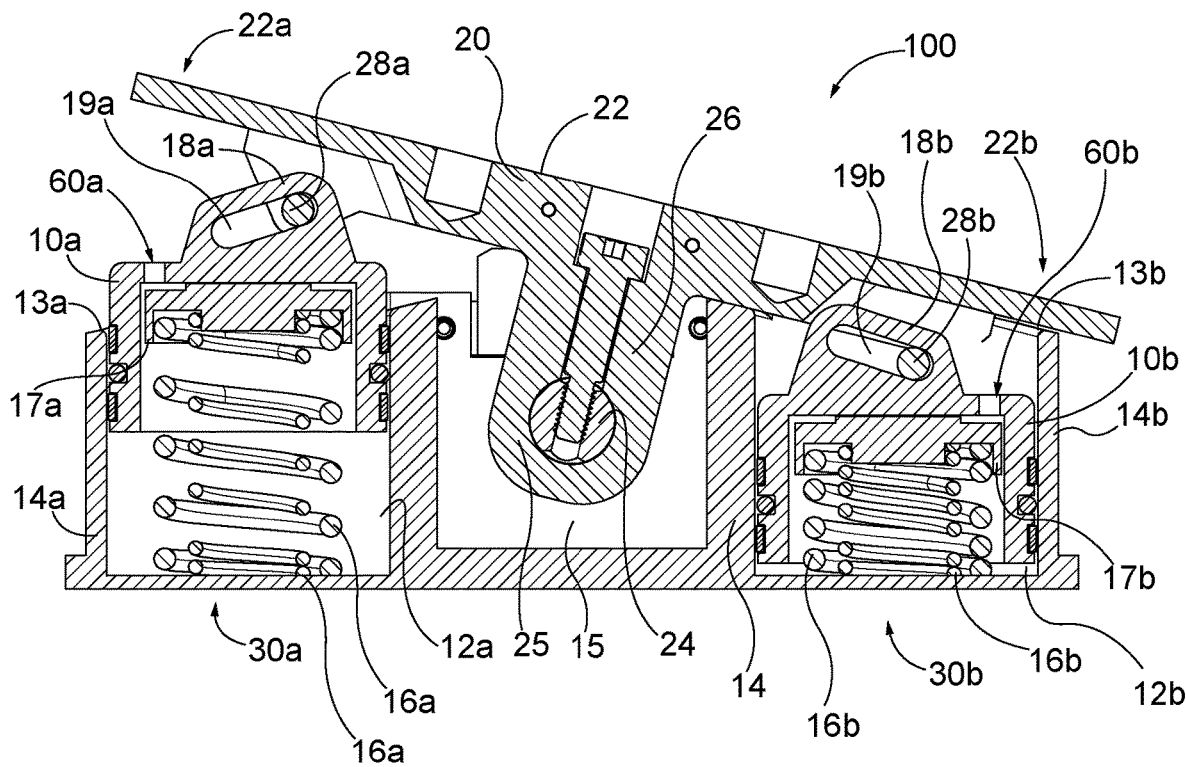
FIG. 2 is a cross-sectional side view of a first embodiment of the non-hydraulic damping mechanism taken through line 2-2 of FIG. 1.
Figure 3:
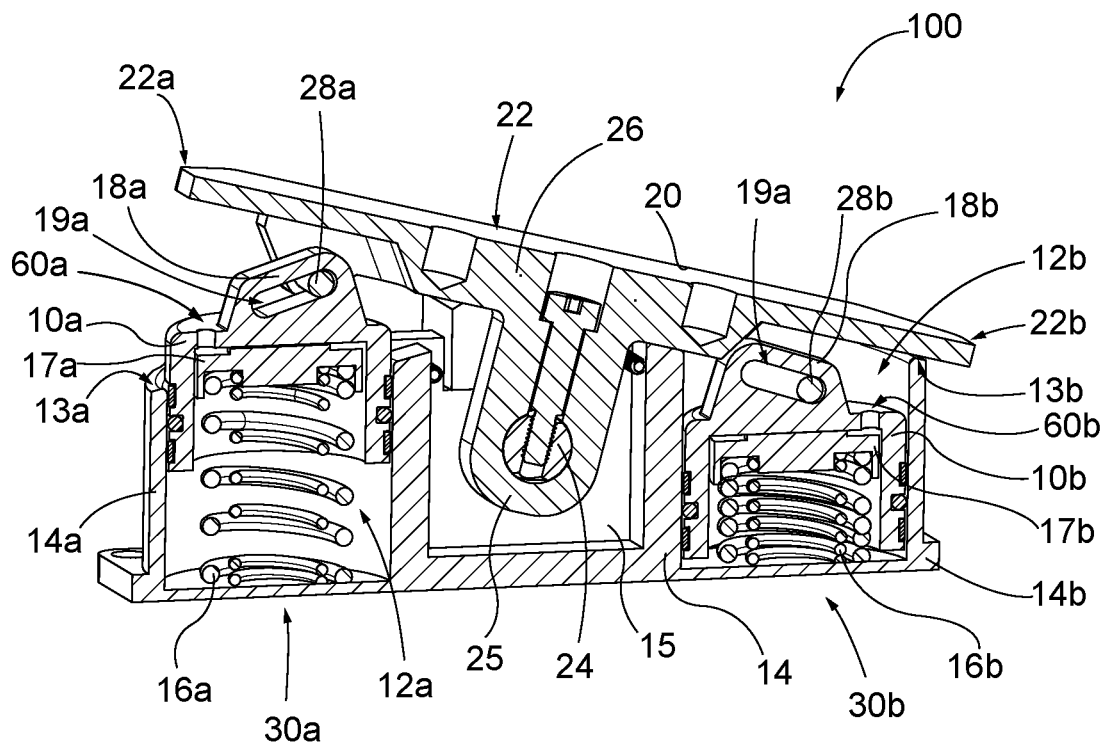
FIG. 3 is a cross-sectional perspective view of the first embodiment, also taken through line 2-2 of FIG. 1.

Turning to the example shown in FIGS. 1-3, a dampened electronic control 100, also referred to herein as a control assembly, controller assembly, or pedal assembly, is shown. Damping portions 30a, 30b are integrated into a housing 14 of the control assembly 100, also called the controller housing 14. The housing 14 may be mounted to a chassis of a vehicle which is operated based at least partially on control signals provided by the controller assembly 100.

The controller assembly 100 comprises a treadle 20 which an operator manipulates, for example by applying pressure to a movable surface 22 provided on an upper surface of the treadle 20. For example, the operator can manipulate the treadle 20 using their foot. The operator moves the treadle 20 between a full-reverse position (shown in FIG. 1), a neutral position (shown in FIG. 4), and a full-forward position (not shown, generally the opposite of FIG. 1). The treadle 20 further comprises a stem 26, which pivots in conjunction with the movable surface 22. The treadle 20 is constrained by the controller housing 14. The treadle is joined to a shaft 24, which defines an axis about which the treadle can pivot. Movement of the treadle 20 is sensed by an electronic sensor 40 (see FIG. 1).

The pedal assembly 100 further comprises an integrated dampening mechanism with a first damping portion 30a and a second damping portion 30b which together act on the treadle 20. The first and second damping portions 30a, 30b are substantially the same, and so for brevity in the following description, only the first damping portion 30a will be described in detail.

The first damping portion 30a comprises a piston 10a fitted into a cylinder 12a of the housing 14, also referred to as a cylinder chamber. The cylindrical chamber 12a surrounds a volume of air which is closed off by the piston 10a. The piston 10a may slide directly against the wall of the cylinder 12a, or the piston 10a may slide directly against an optional sleeve insert (not shown) that may be inserted into the cylinder 12a. Such a sleeve insert could be removable or non-removable. For example, the housing 14 may be made of a metal material, while the piston 10a may be made of a plastic or rubber material. The use of a sleeve insert, which could also be made of a plastic or low-friction material, could facilitate movement of the piston 10a and/or reduce wear on the piston 10a. Optionally, the piston 10a may include one or more piston sealing rings that slidably engage the inner walls of the cylinder 12a. Preferably, the damping mechanism comprises a pair of pistons, with each of the pair of pistons being located on opposite sides of the shaft. More preferably, the pistons are located on opposite sides of the shaft and are equidistant from the shaft. Thus, each of the pair of pistons are configured to impart substantially equal and opposite forces upon the treadle to thereby bias the treadle towards a neutral position.

One or more spring(s) 16a is also enclosed in the cylindrical chamber 12a, which can serve to bias a height of the piston 10a to a neutral control position. An outer side of the piston 10a, optionally an upper or top side of the piston, is provided with an aperture 18a or keyhole, which is connected or slidably connected to a peg 28a provided on the treadle 20, so that a rotation of the treadle 20 about an axis defined by shaft 24 results in, or is translated into, a vertical movement of the piston 10a within the cylinder 12a, and vice versa. Where multiple pistons are used, preferably each of the pair of pistons is separately provided with said spring, and each piston is resiliently biased towards the moveable element equally on opposite sides of the shaft.

In one aspect, the treadle 20 may have the stem 26 located at a position that is generally at a central position relative to an area defined by the movable surface 22. In this case, the movable surface 22 can conceptually be divided into a first area 22a located on one side of the stem 26, and a second area 22b located on the other side of the stem 26. Applying pressure to the first area 22a can result in a counterclockwise movement of treadle 20 about its axis defined by shaft 24 (i.e., as shown in the illustration of FIG. 2). Such counterclockwise movement would cause movement of the treadle 20 towards a full-forward position, which results when the piston 10a reaches a full insertion position within the cylinder 12a. Similarly, applying pressure to the second area 22b can result in a clockwise movement of treadle 20 about its axis defined by shaft 24 towards a full-reverse position (as shown in FIG. 2), which results when the piston 10b reaches a full insertion position within the cylinder 12b. Still, it is contemplated that the stem 26 could be offset a distance from a central position.

The treadle 20 and shaft 24 may be formed integrally, as a single workpiece. In a preferred embodiment, the shaft 24 rotates with the treadle 20. The shaft 24 extends through the housing 14, and a part of the shaft 24 located exterior to the housing 14 is sensed by the sensor 40. However, in an alternative embodiment, the shaft 24 can be fixed, for example, to the housing 14. In this alternative embodiment, the treadle 20 would rotate about the fixed shaft 24, and the treadle's position can be sensed directly by the sensor 40, instead of indirectly, via the shaft 24. In this case, the sensor 40 is preferably provided within the controller housing 14, in proximity to the treadle 20.

The treadle 20 can be operated by foot, in particular by applying an operator's foot to the movable surface 22 in order to alternately depress the first area 22a or the second area 22b. For example, an operator may use his toe to depress the first area 22a, and his heel to depress the second area 22b. In this way, using a rocking movement of the operator's foot, the treadle 20 can be operated to rock either clockwise or counterclockwise. Although not shown, a similar "rocker" concept could likewise be applied for use with a user's hand, arm, or other body part.

Figure 7:
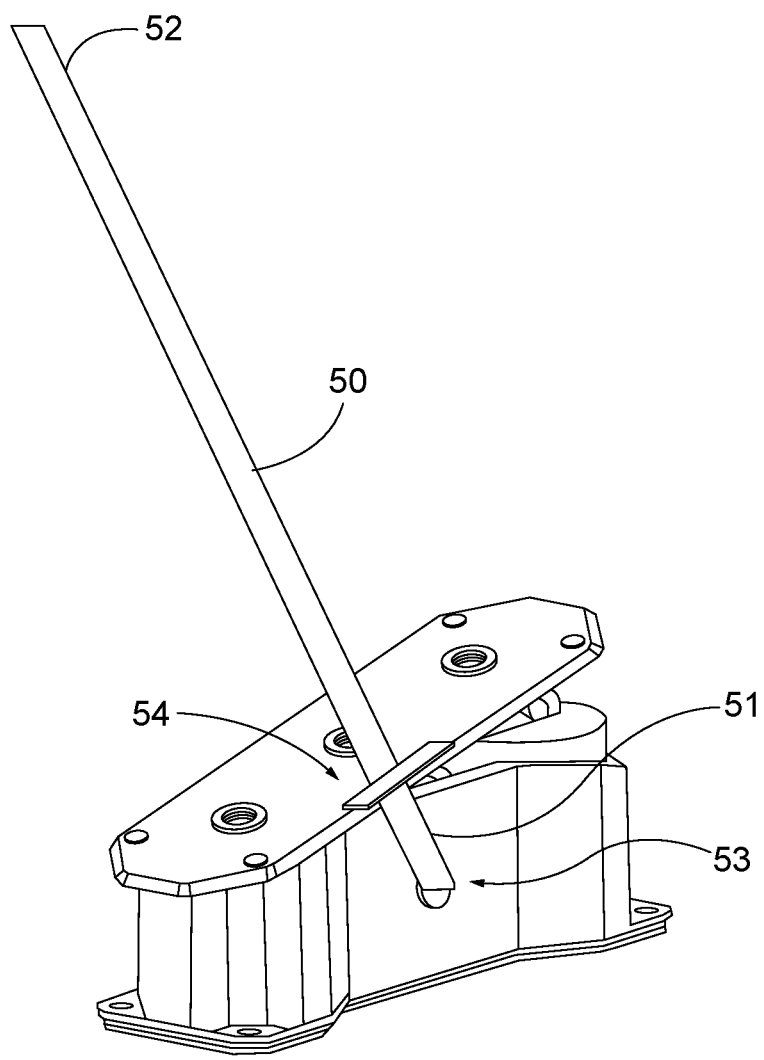
FIG. 7 is a view of an alternative embodiment with a handle provided in addition to a treadle, for operating the control assembly.

However, in an alternative embodiment shown in FIG. 7, the treadle 20 can be provided with an attachment for a handle bar 50. In one example, the attachment can be a socket 53 or other suitable removable or non-removable attachment structure. The handle bar 50 can be a pole or other linear, curved, bent, or angular element suitable for operation with a user's body part, such as foot, arm, or hand. The handle bar 50 may be made of a substantially rigid material that can suitably withstand tensile forces, such as metal or a composite material. In any case, the handle bar 50 can comprise a first end 51 that is attachable to the shaft 24 and/or the treadle 20, and a second end 52 provided at a position which is convenient for an operator of the vehicle to grip. Optionally, the second end 52 may be provided with gripping means such as a rubber grip, possibly with a contoured or textured surface, for the operator's comfort and convenience.

The first end 51 of the handle bar 50 can be permanently affixed to part of the treadle 20, such as part of the movable surface 22. However, in other embodiments, the first end 51 can be permanently attached to another part of the treadle 20, such as the stem 26 or the shaft 24. Alternatively, in any of these embodiments, the handle bar 50 can be provided as a removable element. In other words, the treadle 20 can incorporate a socket 53 and/or a bracket 54 which can removably fix the first end 51 of the handle bar 50 to the treadle 20. In this case, the first end 51 of the handle bar 50 and the socket 53 can each be provided with threaded connections, set screws, or other releasable connection means in order to releasably connect the handle bar 50 to the treadle 20.

In one embodiment in which a handle bar 50 is provided, the movable surface 22 of the treadle may be omitted from the design. Alternatively, the movable surface 22 may be replaced with a simple structural framework for providing pegs 28a, 28b in the desired locations relative to damping portions 30a, 30b.

In another embodiment, the handle bar 50 can be provided (either in a removable configuration or in a permanently fixed configuration), in addition to the movable surface 22 of the treadle 20. In this case, the vehicle operator has a choice of actuating the control assembly 100 using his foot on the movable surface 22, or else using his hand gripping the second end 52 of the handle bar 50. The operator may choose to alternate using foot and hand, or may even choose to use both foot and hand simultaneously to provide more stable operation of the treadle 20.

In one aspect, the movable surface 22 of the treadle 20 can be a substantially flat surface on an upper part of the treadle 20. However, the movable surface 22 could alternatively be provided as a curved surface, for example, designed to conform to the sole of a work boot or an operator's foot. From an overhead perspective, the movable surface 22 may have a substantially rectangular, circular, or footprint-shaped area, or it may have any other polygonal or irregular-shaped area. In one aspect, the movable surface 22 may be coated with a frictional material such as rubber in order to grip an operator's foot or footwear. Alternatively, the movable surface 22 may be machined for roughness or contoured, in order to provide suitable grip. Optionally, bore holes (which optionally can be threaded) may be provided at intervals on the movable surface 22, for example in order to provide a socket (or threaded) attachment for the handle bar 50, or in order to provide an attachment for a separate foot piece (not shown) which can be provided atop the treadle 20. Optionally, the foot piece may be provided as a removable attachment atop treadle 20, to facilitate cleaning of the foot piece or to allow it to be easily replaced if dirty or damaged.

On an underside of the first area 22a and second area 22b of the movable surface 22 of the treadle 20, a first peg 28a and a second peg 28b are provided. The first and second pegs 28a, 28b may be formed integrally with the treadle 20, or they may be formed as separate pieces and attached to the treadle 20. The first and second pegs 28a, 28b may be shaped in the form of a pin, a hook, a tongue, or any other form suitable for engaging apertures 19a, 19b of pistons 10a, 10b.

The stem 26 of the treadle 20 may be contoured to fit within an open chamber of the controller housing 14. Optionally, the stem 26 of the treadle 20 may be contoured to fit on a stem receiving portion 15 of the controller housing 14. In particular, the stem 26 may have a top which attaches to the movable surface 22, and a base portion 25 that is disposed within a stem receiving portion 15 of the controller housing 14. The stem receiving portion 15 may be an open space, or optionally may have a contour that complements the stem receiving portion 15 of the controller housing 14. In this way, the treadle 20 can be supported by the stem receiving portion 15 of the controller housing 14, while at the same time the treadle 20 can still rotate freely about the axis defined by shaft 24. The rotation occurs with minimal friction between the base portion 25 of the stem 26 and the stem receiving portion 15 of the controller housing 14. In particular, the base portion 25 of the stem 26 and the stem receiving portion 15 of the controller housing 14 may be machined for smoothness, and/or provided with a coating to minimize friction there between.

The shaft 24 may be formed integrally with the treadle 20, or joined to the treadle 20 by a suitable fastener 27. The shaft 24 is constrained in the housing 14 such that the shaft 24 (along with the adjoining treadle 20) can be rotated in a clockwise or a counterclockwise direction, about an axis defined by the shaft 24.

The controller housing 14 may be designed with flanges and/or bolt holes 11 to allow the housing 14 to be bolted to a vehicle. Preferably, the bolt holes 11 are spaced about the controller housing 14, such as at the corners and/or edges, although it is contemplated that various suitable placements can be used for a particular application or vehicle. Further, the controller housing 14 may be designed with a first sidewall 14a and a second sidewall 14b. The first and second sidewalls 14a, 14b may each be provided at a distance from the axis of rotation of the treadle 20. Further, the first sidewall 14a may have a first height and the second sidewall 14b may have a second height, said heights being chosen to limit the range of movement of the rotation of the treadle 20. In other words, the treadle 20 may be rotatable in the counterclockwise direction from a neutral position to a full-forward position, in which the first area 22a of the treadle 20 contacts the first sidewall 14a. In the full-forward position, the treadle 20 can be prevented from rotating further in the counterclockwise direction by an optional first stop surface 13a provided at the top of the first sidewall 14a. Similarly, the treadle 20 may be rotatable in the clockwise direction from a neutral position to a full-backward position, in which the second area 22b of the treadle 20 contacts the second sidewall 14b. In the full-backward position, the treadle 20 can be prevented from rotating further in the clockwise direction by an optional second stop surface 13b provided at the top of the second sidewall 14b.

Alternatively or in addition, a further stop surface (not shown) may be provided (or complimentary stop surfaces may be provided) on the base portion of the stem 26 and/or on the stem receiving portion of the controller housing 14, in order to prevent the treadle 20 from being rotated beyond its intended range of motion between the full-forward and full-backward positions.

In general, the treadle 20 can be biased into a neutral position. In the neutral position, the movable surface 22 may be located at an angular position between the full-forward and full-backward positions. In one aspect, the neutral position may be substantially at the midpoint or center of the range of motion of the treadle. In other aspects, the neutral position may be located closer to the full-forward position or closer to the full-backward position. Preferably, in the neutral position, the treadle 20 is at a substantially horizontal angle of about zero degrees with respect to a ground plane or surface upon which the controller housing 14 is mounted, or other desired set point.

In any case, the rotational position of the treadle 20 is sensed by a sensor 40, such as preferably an electronic sensor. The sensor 40 may be located, for example, on housing 14. Alternatively, the sensor 40 may be fixed to a chassis of the vehicle on which the controller housing 14 is mounted. Either way, the sensor 40 should preferably be located at a position which allows it to sense a rotational position and/or rotational movement of shaft 24. In one aspect, the sensor is preferably a Hall Effect sensor. Alternatively or in addition, it is equally possible to employ other types of sensor, such as contact sensors, CAN sensors, various types of sensor that produce an analog or digital output, optical sensors, and/or inductive sensors.

The sensor 40 produces a signal which indicates the rotational position and/or movement of the shaft 24. From this, the position and/or movement of the treadle 20 can be deduced. The signal can be variously employed to drive or operate the vehicle. In particular, in one aspect, the signal can indicate two complimentary operating parameters, such as an acceleration value and a braking value. According to this aspect, when the treadle 20 is between the neutral position and the full-forward position, an acceleration value corresponding to the degree of rotation of the treadle 20 will be produced as the control signal. When the treadle 20 is at the full-forward position, a maximum forward acceleration signal may be produced. Similarly, when the treadle 20 is between the neutral position and the full-backward position, no acceleration signal (or a zero acceleration signal) may be produced. Alternatively, a braking value corresponding to the degree of rotation of the treadle 20 will be produced as the control signal. When the treadle 20 is at the full-backward position, a maximum braking signal may be produced. Alternatively, when the treadle 20 is at the full-backward position, a maximum reverse acceleration signal could be produced. Optionally, a control signal can also be produced when the treadle 20 is in the neutral position, indicating as much. In a different example, in a directional control system, counter-clockwise movement (as shown in FIGS. 1-2) could result in forward movement of a vehicle, while a clockwise movement results in rearward movement.

In another alternative aspect, the rotational position of the treadle 20 could be used to generate an output signal to control the position of an arm of an excavator. According to this aspect, rotating the treadle 20 counter-clockwise could result in the arm of the excavator moving forward, and rotating the treadle 20 clockwise could result in the arm of the excavator moving backward. Alternatively, complementary movements in the upward and downward directions are contemplated. In a further alternative, complementary rotational movements of an arm (such as in a clockwise and counterclockwise direction) are contemplated.

In yet another alternative aspect, the entire rotational range of movement of the treadle 20 could correspond to a single output value. According to this aspect, putting the treadle 20 in the full-backward position would result in a control signal of zero, while putting the treadle 20 in the full-forward position would result in a control signal indicating a maximum possible value. Alternatively, the control could be selectively disabled by causing all treadle positions between the neutral position and the full-backward position to produce a control signal of zero. In other words, any control output when the treadle is rotated clockwise from the neutral position could be effectively disabled. In an analogous embodiment, clockwise rotation of the treadle 20 could result in a control signal, while counter-clockwise rotation beyond the neutral position could cause the control signal to effectively be disabled. One of skill in the art can envision many other control schemes available by sensing the rocking movement of the treadle 20.

As noted above, the pistons 10a, 10b, cylinders 20a, 20b, and springs 16a, 16b of the first and second damping portions 30a, 30b are substantially the same. Accordingly, only piston 10a, one cylinder 12a, and one spring 16a will be described in detail; however, this description also applies to piston 10b, cylinder 12b, and spring 16b, in analogy to piston 10a, cylinder 12a, and spring 16a.

In the embodiment shown, piston 10a has a substantially cylindrical sidewall, an outer surface of which is designed to be in continuous contact with an inner surface of cylindrical chamber 12a. Optionally, the piston 10a may include one or more piston sealing rings that slidably engage the inner walls of the cylinder 12a.

In alternative embodiments, the piston 10a may have a cross-section that is not circular, but rather oval, polygonal, or irregular. In this case, a cross-section of the inner wall of cylinder 12a should be shaped and dimensioned to match the cross-section of the piston 10a. The outer wall of piston 10a preferably has a height that is less than or equal to a height of the inner surface of the cylindrical chamber, so as to allow the piston 10a to be depressed into cylindrical chamber 12a. In other words, the height of the piston 10a should not impede the first area 22a of movable surface 22 from contacting the first sidewall 14a of the housing 14. Similarly, however, the combined heights of the piston 10a and cylindrical chamber 12a should be greater than a maximum height of the first area 22a of the movable surface 22 when the treadle 20 is in the full-backward position. In this way, the movable surface 22 of the treadle 20 acts as a stop and prevents the piston 10a from being dislodged from the cylinder 12a by an upward movement of the first area 22a of the movable surface 22 due to a rotation of the treadle 20 in the clockwise direction.

A moveable connection is provided between each piston and the treadle. For example, on its upper surface, the piston 10a is provided with at least one aperture 19a. The aperture 19a may be formed as a slot or keyhole, or other type of hook or clasp that is capable of engaging the peg 28a which is provided on the movable plate 22. The aperture 19a may be formed integrally with the piston 10a, or the aperture 19a may be assembled onto the piston 10a using a separate workpiece or pieces that have been shaped to suit the purpose. The aperture 19a is provided at a location on the piston 10a so as to engage the peg 28a of treadle 20, with both the piston 10a and the treadle 20 being seated in housing 14. Because the treadle 20 moves in an arc, whereas the pistons 10a, 10b move in a linear, vertical direction, the aperture 19a may be formed as a slot with an angled, curved or arcuate engagement surface, in order to allow the peg 28a of the treadle 20 leeway to move laterally within the aperture 19a as the treadle 20 traverses its arcuate path. In other words, the aperture 18a can have a cam geometry that closely follows the movement path of the peg 28a during rotation of the treadle 20. Additionally, the cam geometry of the aperture 18a can be configured to drive the vertical motion of the piston 10a at a desired rate and/or amount to meet a desired damping action. In any case, the connection between the peg 28a and aperture 19a should be such that the peg 28a remains permanently within the aperture 19a, regardless of the rotational position of the treadle 20. In other words, the peg 28a should not be released from the aperture 19a during operation of the control assembly 100.

Between the piston 10a and the cylindrical chamber 12a, a spring 16a is provided (and optionally, a plurality of springs). As shown, the springs can be helical coil springs. Other types of springs are contemplated, including volute springs, spiral torsion springs, tension springs, leaf springs, etc. In yet a further example, it is contemplated that the spring could be manufactured together with the piston 10a itself, so as to create a monolithic part. For example, the spring could be provided by flexible arms that extend outwardly or downwardly from the piston to engage with the cylindrical chamber 12a. Additionally, it is contemplated that the amount of damping force provided by the pistons 10a can be adjusted by changing out the spring for one of a different rate, spring constant or force constant. The height of the spring 16a and spring force of the spring 16a may be chosen such that springs 16a, 16b are under an equal amount of tension or compression, when the treadle 20 is in the neutral position. In any case, the cumulative force of both springs 16a, 16b on the treadle 20 should be zero when the treadle 20 is in the neutral position.

An inner surface of the piston 10a preferably contains a circular ridge or groove 17a, 17b for engaging a top portion of the spring 16a and holding it in place. Optionally, similar or different structure can likewise be provided in the cylinder 12a to hold the other end of the spring 16a. It is contemplated that each piston 10a, 10b may utilize a single spring, or may utilize two or more springs to achieve a sufficient performance for the piston 10a movement within the cylinder 12a, or an operational feel of the treadle 20, or for other various reasons. For example, as shown, each piston 10a, 10b may utilize a pair of springs 16a, 16b that are generally coaxially arranged within the piston 10a, 10b. The springs may be held inside the piston in various manners. In the shown examples, one spring with a relatively larger diameter may engage the inner diameter walls of the piston 10a, 10b, while the other spring with a relatively smaller diameter may engage the circular ridge or groove 17a, 17b which is located more towards the center of the piston 10a, 10b. It is further contemplated that the two or more springs 16a, 16b within each cylinder 12a, 12b may have the same spring constant, or different spring constants. In this way, by exchanging the springs within each cylinder, the spring force can be readily customized.

The piston 10a is engaged in the cylinder 12a, which is formed in housing 14. The cylinder 12a comprises one or more sidewalls and a base, which define an inner surface of the cylinder. The base of the cylinder optionally may contain a circular ridge or groove for engaging a bottom portion of the spring(s) 16a and holding it in place. The cylinder 12a is open in an upward direction; this opening is effectively closed off by the piston 10a. The dimensioning of the cylinder 12a, and more specifically, the size, shape and height of the inner walls of the cylinder 12a, are chosen to match and complement the size, shape and height of the piston 10a, as described above. The inner surface of the cylinder 12a is a closed, continuous surface. In a preferred aspect, the sidewalls, base, and all junctions therebetween are not provided with any inlets or outlets. Therefore, the inner surface of the cylinder 12a is sealed off, and is not adapted to let hydraulic fluid or other non-compressible fluid into or out of the cylindrical chamber 12a.

However, in alternative aspects, adaptations may be made to the outer sidewall of the piston 10a and/or the inner sidewall of the cylinder 12a to control the rate of flow of air, which is a compressible fluid, into and out of the cylindrical chamber 12a. In particular, the sidewalls may be provided with substantially vertical grooves, or alternatively angular or curved grooves, to allow air to escape more quickly, and to allow an imbalance in air pressure on the inside of the cylindrical chamber 12a relative to the ambient air pressure to be resolved.

Figure 4:
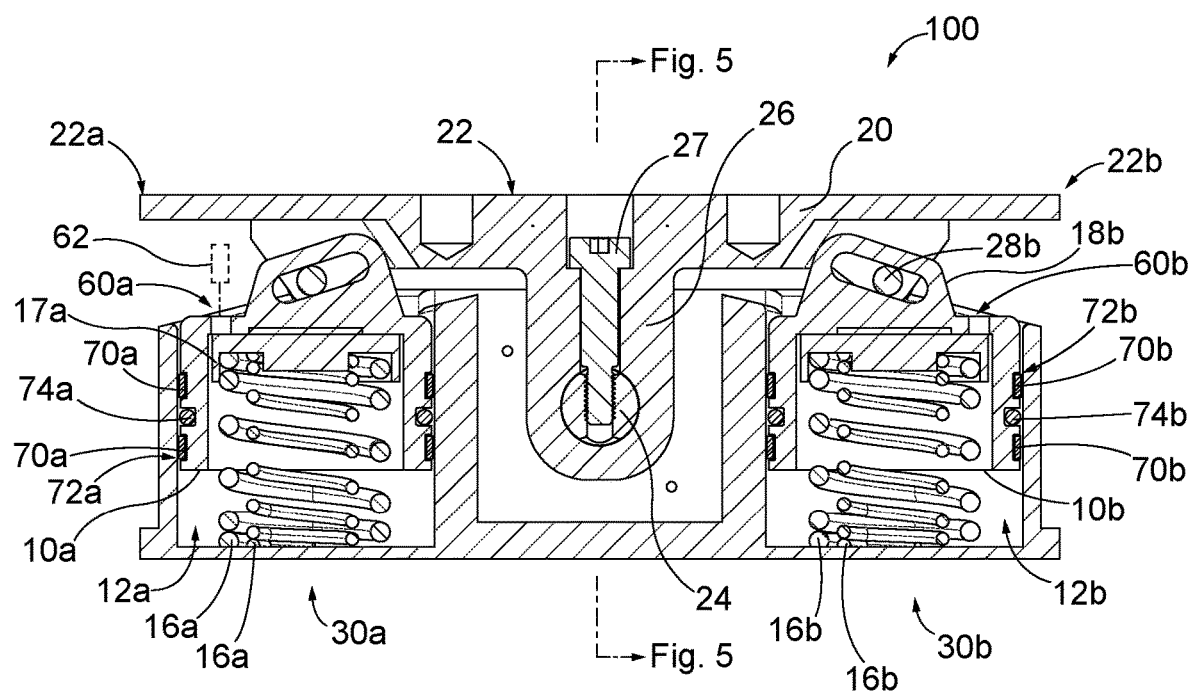
FIG. 4 is a cross-sectional side view of the non-hydraulic damping mechanism taken through line 2-2 of FIG. 1, with the mechanism in a neutral position.

Optionally, the piston 10a may include one or more piston sealing rings that slidably engage the inner walls of the cylinder 12a. For example, as shown in FIG. 4, the pistons 10a, 10b may include at least one sealing ring 70a, 70b and optionally a plurality of sealing rings 70a, 70b that circumscribe the outer diameter of the piston 10a, 10b and are in direct sliding contact with the inner walls of the cylinder 12a, 12b. In the shown example, each piston includes two sealing rings 70a, 70b, although more or less sealing rings can be used. Each sealing ring 70a, 70b sits in an annular recessed groove 72a, 72b on the exterior of the piston 10a, 10b. The sealing rings 70a, 70b may be a continuous annular design, or may have an opening or slit extending therethrough to facilitate snap-fit installation into the recessed groove 72a, 72b. Preferably, the sealing rings 70a, 70b are made of a compatible and low friction material, such as Polytetrafluoroethylene (PTFE). Alternatively, the sealing rings 70a, 70b could be made of a plastic or even rubber material. Optionally, a rubber O-ring 74a, 74b may be used in one or more of the recessed grooves 72a, 72b. The use of an O-ring may also help to increase the seal and limit air exchange between the cylinder 12a, 12b and the exterior environment. Optionally, at least one of the PTFE rings 70a, 70b may be used together with a rubber O-ring 74a, 74b in the recessed groove 72a, 72b and interposed between the piston 10a, 10b and the sealing ring 70a, 70b. In this way the O-ring can actively bias the PTFE ring outwards into engagement against the inner walls of the cylinder 12a, 12b.

In addition or alternatively, as shown, one or more bore holes 60a, 60b may be provided in the piston 10a or cylinder 12a to allow air to flow into or out of the cylindrical chamber 12a. In other words, the bore holes 60a, 60b can extend completely through the piston to provide fluid communication between the air contained within the cylindrical chamber 12a and the exterior environment outside the housing 14. For example, as the piston 10b is moved towards the lowest position (as shown in FIG. 2), air within the cylinder 12b is driven out via the bore hole 60b. At the same time, air is drawn into the other cylinder 12a via the bore hole 60a as the cylinder 12a is moved towards the uppermost position. The size, number, and/or position of the bore holes 60a, 60b can be adapted to provide a desired flow rate or amount of air to thereby achieve a desired damping rate for the pistons 10a, 10b. In addition or alternatively, the outer sidewall of the piston 10a and/or the inner sidewall of the cylinder 12a may be machined or coated with materials to create a more airtight interface, which can allow the damping effect of air trapped in the cylindrical chamber 12a to be sustained for a longer period of time. In other words, by creating a more airtight interface, the air pressure differential between the chamber and the outside is more slowly neutralized, allowing the damping effect of the air inside the cylinder to last longer. As discussed above, the piston 10a may include one or more piston sealing rings that slidably engage the inner walls of the cylinder 12a to achieve or regulate such an airtight (or limited leaking) interface.

Optionally, as shown in FIG. 4, a valve 62 may be provided at the bore hole 60a, 60b of the pistons 10a, 10b to control or limit the exchange of air in the cylinders 12a, 12b. In one example, the valve 62 may be a set screw that is threadingly engaged with the bore hole 60a, 60b to control the flow of air therethrough. The set screw could have a constant diameter, or even a tapered diameter, and may act similar to a needle valve. Thus, the rate or amount of airflow exchange from the bore hole 60a, 60b can be selectively adjusted by relatively inserting the valve 62 more or less into the bore hole 60a, 60b. It is to be appreciated that although only one valve 62 is illustrated, both pistons 10a, 10b may include a valve. It is further appreciated that various other types of valves or flow restrictors could be utilized, such as ball valves, gate valves, butterfly valves, plug valves, etc.

The integrated damping mechanism implemented by damping portions 30a, 30b will now be described in detail. When the operator pushes the treadle 20 out of the neutral position, then the pegs 28a, 28b push the pistons 10a, 10b upward and downward, respectively. This causes the springs 16a, 16b to be expanded and compressed, respectively. The springs 16a, 16b therefore provide a force on the treadle 20 which biases the treadle 20 back toward the neutral position. In other words, the springs 16a, 16b provide a biasing mechanism which acts on the treadle 20. The force provided by the springs 16a, 16b is generally proportional to the degree of rotation of the treadle 20 away from its neutral position. In other words, when the treadle 20 is in the full-forward or full-backward position, then the combined spring force of springs 16a, 16b is strongest, and the spring force acts in the direction that biases the treadle 20 back to the neutral position. Importantly, the force of springs 16a, 16b depends only on the rotational position of the treadle 20. In other words, the force of springs 16a, 16b is constant over time, presuming that the treadle 20 remains in the same position. The constant spring force from springs 16a, 16b remains constant at a value determined by the treadle's angular position, for each possible angular position of the treadle 20.

Another component of the integrated damping portions 30a, 30b is not constant, but instead changes over time. Whenever the treadle's angular position changes from a first position to a second position, then the pistons 10a, 10b are drawn up and/or pushed down, respectively, into cylinders 12a, 12b. This causes the air in one of the cylindrical chambers 12a to be compressed, while the air in the other one of the cylindrical chambers 12b is expanded, thinned out or subjected to a vacuum force. This dampens the movement of the treadle 20, as the unequal pressurization of the air within cylinders 12a, 12b will momentarily cause a force that pushes the treadle 20 from the second position back into the first position. The momentary damping due to air in cylinders 12a, 12b is not constant over time. Instead, this damping force is released or neutralized over time, as the air within the cylinders 12a, 12b communicates with outside air via the boundary between the outside wall of pistons 10a, 10b and the inner wall of cylinders 12a, 12b, and/or via the bore holes 60a, 60b. In other words, after a period of several seconds or tenths of seconds, the air pressure within the cylinders 12a, 12b will be equivalent to ambient air pressure outside the control assembly 100, meaning that the dampening force toward the treadle's previous position is gradually released.

Due to the spring forces applied by springs 16a, 16b, the integrated damping portions 30a, 30b can bias the treadle toward a neutral position. Preferably, the springs 16a, 16b are identical within both cylinders 12a, 12b so that they apply substantially identical torsion forces across the shaft 24 to thereby drive the treadle 20 back to the neutral position (see FIG. 4).

The integrated damping portions 30a, 30b can also regulate the operator force. In particular, the springs 16a, 16b ensure that a pressure on the operator's foot provides immediate feedback to the operator about the degree to which the treadle's current position diverges from the treadle's neutral position. Furthermore, as the operator changes the position of the treadle 20, the air within cylinders 12*a*, 12*b* provide a damping effect along the entire range of movement of the treadle 20, thus preventing the treadle 20 from being pushed in any direction too quickly.

Finally, the integrated damping portions 30*a*, 30*b* can also prevent unwanted actuation due to shocks from outside forces. This is due both to the neutral-biasing effect of springs 16*a*, 16*b*, as well as to the compressed-air damping effect of cylinders 12*a*, 12*b*.

Figure 5:
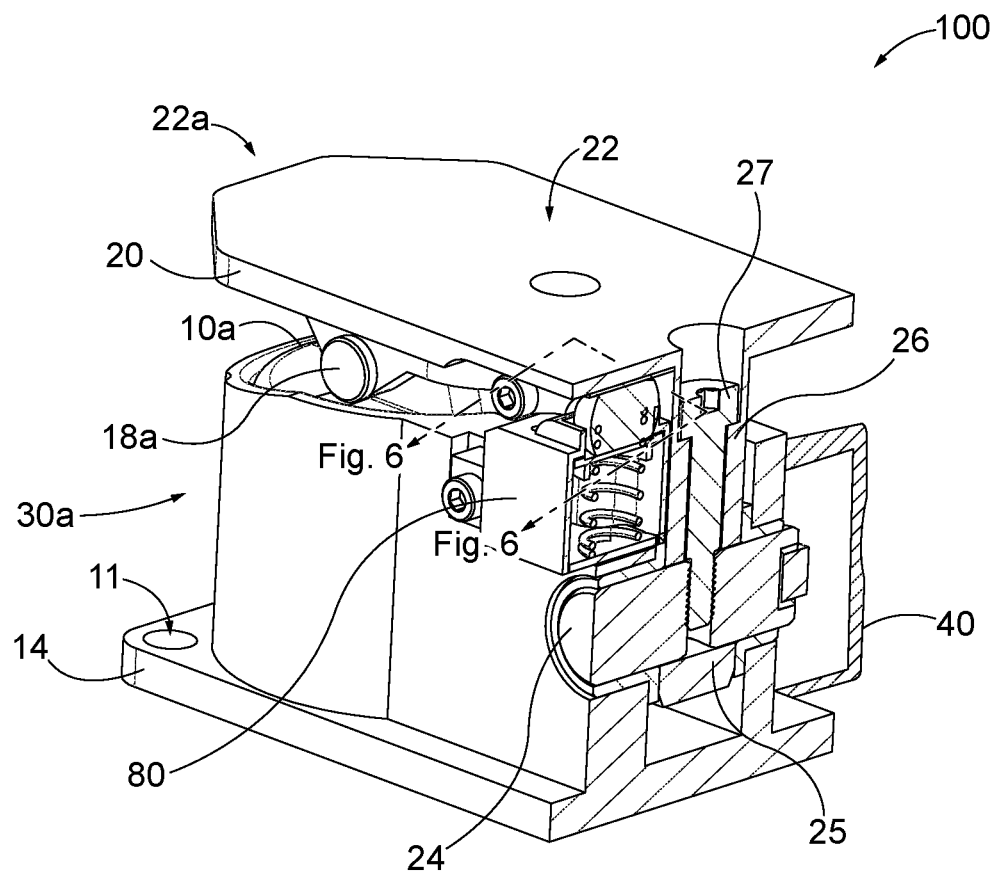
FIG. 5 is a cross-sectional front view of the non-hydraulic damping mechanism taken through line 5-5 of FIG. 4.
Figure 6A:
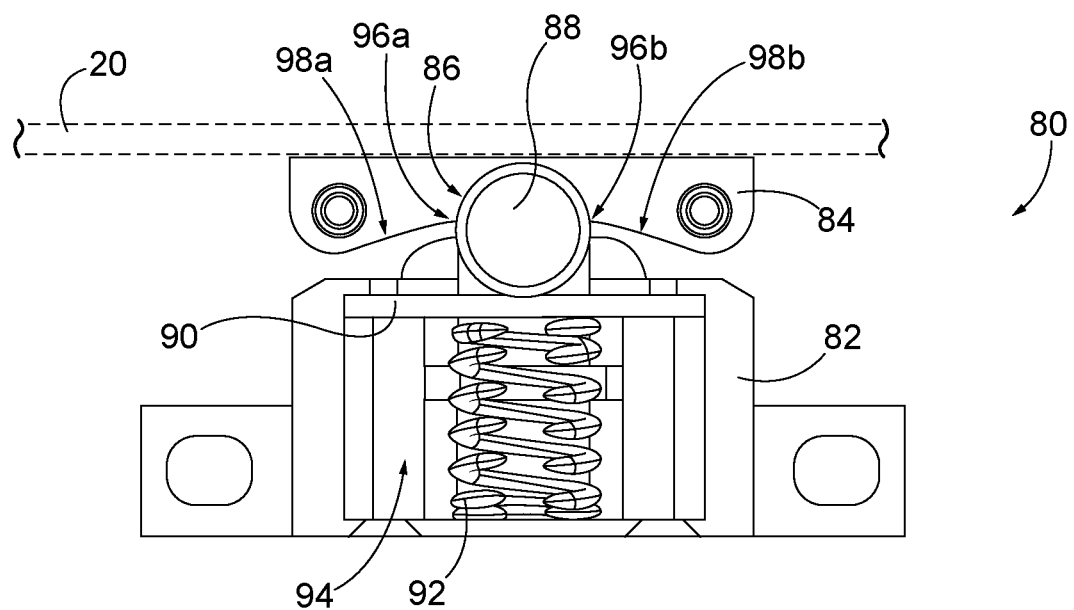
FIGS. 6A-6B are detail cross-sectional side views of a neutral detent mechanism taken through line 6-6 of FIG. 5.
Figure 6B:
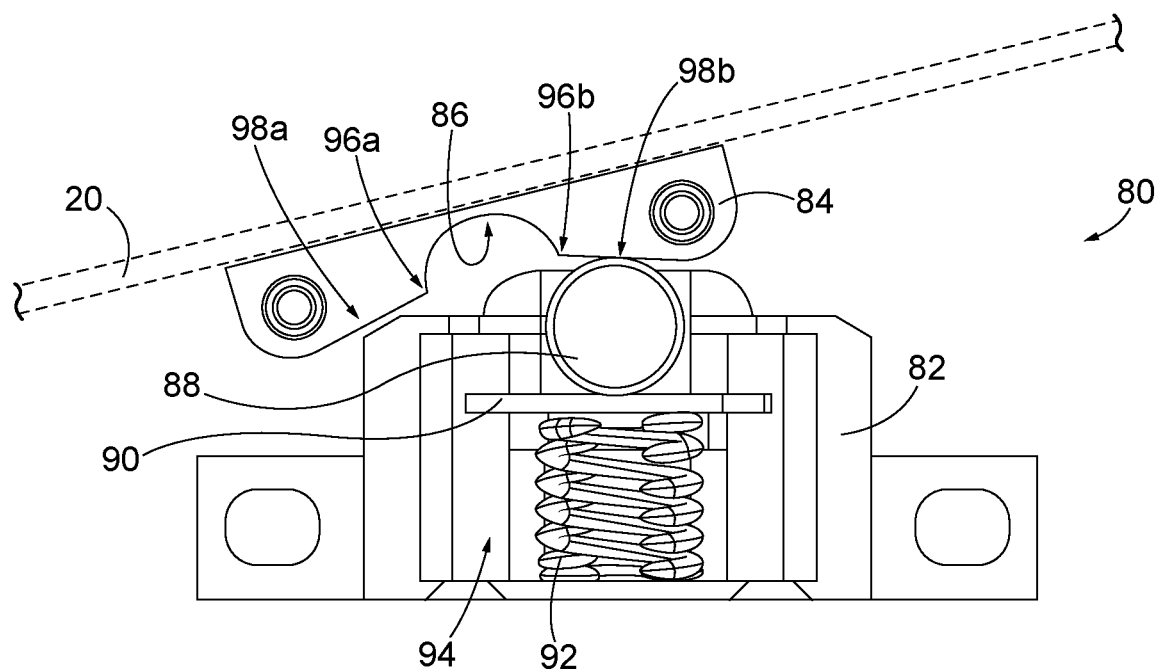

Turning to FIGS. 5 and 6A-6B, the controller assembly 100 may further comprise a neutral detent mechanism 80 that actively moves the treadle 20 back towards the neutral position (e.g., the treadle 20 is at a substantially horizontal angle of about zero degrees with respect to a ground plane or surface upon which the controller housing 14 is mounted, or other desired neutral position), as well as providing haptic feedback to the user that the treadle 20 has returned to neutral position. The neutral detent mechanism 80 is attached to a side of the housing 14 and is in engagement with the treadle 20.

As shown in FIG. 6A, a mechanism body 82 is removably secured to a side of the housing 14, or alternatively could even be formed together with the housing 14. A cam plate 84 is rigidly secured to the treadle 20 to move together therewith. Optionally, the cam plate 84 could be formed together with the treadle 20. In the shown example, the cam plate 84 has one face attached to an underside of the treadle 20 and pivots together with the treadle 20, although various mounting configurations are contemplated. The cam plate 84 further includes a recess defined by a cam surface 86 located on an opposite face. Preferably, the cam surface 86 has a concave, curved geometry. A cam follower pin 88 is received and seated in contact with the cam surface 86. Preferably, the cam surface 86 and cam follower pin 88 are vertically aligned with the shaft 24 about which the treadle 20 can pivot. In one example, the longitudinal axes of the cam surface 86, cam follower pin 88, and shaft 24 all lie along the same plane. The cam follower pin 88 is seated on top of a carrier plate 90 that is resiliently biased by a spring 92. In the shown example, the carrier plate 90 is resiliently biased upwards to press the cam follower pin 88 into engagement with the cam surface 86 by a torsion spring, although various other springs can be used. The spring 92 is located within an interior 94 of the mechanism body 82 on an underside of the carrier plate 90, and may be retained within an annular ring. The carrier plate 90 is configured to translate linearly upwards and downwards within the interior 94.

The diameter of the cam surface 86 is generally equal to or slightly larger than the diameter of the cam follower pin 88 so that the pin is readily received within the concave cam surface recess. Thus, as the cam plate 84 rotates, the cam follower pin 88 begins to exit the concave cam surface as one end 96*a*, 96*b* of the cam surface 86 passes over the cam follower pin 88. Next, a cam action face 98*a*, 98*b* engages with and presses downwards upon the cam follower pin 88 in opposition to a force applied by the spring 92 of the cam follower pin 88.

When the treadle 20 is in the neutral position, as shown in FIGS. 4 and 6A, the cam follower pin 88 is seated in the center of the cam surface 86 and the carrier plate 90 is located at the top-most position with the spring 92 at maximum extension. As the treadle 20 begins to rotate back to one of the full forward or reverse conditions, shown in FIGS. 2 and 6B, the cam plate 84 rotates together with it at the same angle, followed by one end 96*a*, 96*b* of the cam surface 86 (depending upon whichever direction the treadle 20 is pivoted). Thereafter, the cam follower pin 88 is dislodged from the concave cam surface 86 as the cam action face 98*a*, 98*b* rides up onto the cam follower pin 88 and applies a downward force upon the cam follower pin 88. The carrier plate 90 is thereby pushed vertically downwards within the interior 94, which compresses the spring 92. Upon returning the treadle 20 to the neutral position, the spring 92 pushes the carrier plate 90 upwards, which forcibly inserts the cam follower pin 88 back into the recess defined by the cam surface 86.

This movement of the cam follower pin 88 into and out of the recess defined by the cam surface 86 creates a force-feedback haptic response in the form of a "click" response that can be felt by the user. Thus, when the treadle 20 is moved back towards the neutral position, the user can physically feel the "click" action of the cam follower pin 88 being forcibly inserted into the recess of the cam plate 84 recess defined by the cam surface 86. Optionally, as the treadle 20 is then moved away from the neutral position, the user may also be able to physically feel the cam follower pin 88 being forced out of the recess of the cam plate 84. In addition or alternatively, is it further contemplated that any or all of the cam follower pin 88, cam surface 86, and/or carrier plate 90 may include a plurality of ridges or detents that provide a series of physical haptic "clicks" that can be felt by the user as the treadle 20 moves away from the neutral position and towards the full-forward or full-reverse/ brake positions. In this way the user may have a greater understanding of the treadle movement. Lastly, the force applied by the spring 92 onto the cam follower pin 88 may help to maintain the treadle 20 in the neutral position, since the cam follower pin 88 is encouraged to remain at the center of the recess of the cam plate 84 due to the spring 92 force in combination with the ends 96*a*, 96*b* of the cam surface 86.

The integrated damping portions 30*a*, 30*b* described herein may be provided as a standalone assembly. Alternatively, a control assembly 100 may be provided, which incorporates the integrated damping portions 30*a*, 30*b* as described herein. Still further, a system may be provided, comprising a vehicle with a control assembly that incorporates an integrated damping mechanism as described herein.

The treadle 20, housing 14, and pistons 10*a*, 10*b* as described herein can each individually be made of one or more of various materials, including but not limited to steel or other metals, resins, rubbers, fiberglass or other compound materials, or hard plastics. Different materials can be used for different ones of these parts. Furthermore, various ones of these parts can be manufactured using molding, subtractive technologies such as cutting or milling, or additive technologies such as 3D printing. Finally, each one of these parts can be made integrally as a single workpiece, or various ones of these parts can individually be assembled from component pieces.

Lastly, it is to be appreciated that when used in a rugged or dirty environment, the control assembly 100, in whole or part, may be covered by a suitable flexible covering that isolates the internal components from the dirty exterior environment. For example, a flexible rubber boot or the like may completely cover the control assembly 100 and be attached to either or both of the treadle 20 and housing 14. Preferably, such a flexible rubber boot includes one or more corrugations that provide suitable flexibility to enable the boot to readily move together with the treadle 20 among the various operative positions.

The invention has been described with reference to the example embodiments described above. Modifications and alterations will occur to others upon a reading and understanding of this specification. Examples embodiments incorporating one or more aspects of the invention are intended to include all such modifications and alterations.

What is claimed is:

1. A dampened electronic control for manual operation to control a machine, comprising:
   a housing;
   a movable element pivotally supported in the housing upon a shaft with a rotation axis;
   an electronic sensor configured to detect rotational movement of the shaft; and
   a non-hydraulic damping mechanism coupled to the moveable element, the damping mechanism comprising:
      a piston disposed in a cylinder of the housing and configured to operate with air inside the cylinder as the working fluid; and
      a spring adapted to resiliently bias the piston towards the moveable element,
   wherein movement of the moveable element towards the piston causes the piston to compress the air inside the cylinder to thereby provide a resistance force against the moveable element to thereby dampen the movement of the moveable element, and
   wherein the piston is provided with an aperture that is slidably connected to a peg provided on the moveable element so that a rotation of the moveable element about the rotation axis of shaft results in a vertical movement of the piston within the cylinder.

2. The dampened electronic control of claim 1, wherein the moveable element comprises a treadle.

3. The dampened electronic control of claim 1, wherein the sensor comprises a Hall effect sensor.

4. The dampened electronic control of claim 1, wherein the damping mechanism comprises a pair of pistons, with each of the pair of pistons being located on opposite sides of the shaft.

5. The dampened electronic control of claim 4, wherein each of the pair of pistons are configured to impart substantially equal and opposite forces upon the moveable element to thereby bias the moveable element towards a neutral position.

6. The dampened electronic control of claim 4, wherein each of the pair of pistons is separately provided with said spring, and each piston is resiliently biased towards the moveable element equally on opposite sides of the shaft.

7. The dampened electronic control of claim 1, wherein an inner surface of the piston comprises a circular ridge or groove to engage and retain a top portion of the spring.

8. The dampened electronic control of claim 1, wherein the piston comprises at least one sealing ring that slidably engages the inner walls of the cylinder.

9. The dampened electronic control of claim 1, wherein the piston comprises a bore hole extending completely through the piston to provide fluid communication between air contained within the cylinder and an exterior environment outside the housing.

10. A dampened electronic control for manual operation to control a machine, comprising:
    a housing;
    a movable element pivotally supported in the housing upon a shaft with a rotation axis;
    an electronic sensor configured to detect rotational movement of the shaft; and
    a non-hydraulic damping mechanism coupled to the moveable element, the damping mechanism comprising:
       first and second pistons located on opposite sides of the shaft, each piston being disposed within first and second cylinders, respectively, of the housing and configured to operate with air inside the cylinder as the working fluid;
       a moveable connection provided between each piston and the moveable element so that a rotation of the moveable element about the rotation axis of shaft results in a vertical movement of each piston within the respective cylinder; and
       a spring provided to each piston and adapted to resiliently bias said piston towards the moveable element,
    wherein movement of the moveable element towards the first piston causes said first piston to compress the air inside the first cylinder to thereby provide a resistance force against the moveable element to thereby dampen the movement of the moveable element, and
    wherein moveable connection of the first and second pistons comprises an aperture that is slidably connected to a peg provided on the moveable element so that a rotation of the moveable element about the rotation axis of shaft results in a vertical movement of the first and second pistons within the first and second pistons, respectively.

11. The dampened electronic control of claim 10, wherein movement of the moveable element away from the second piston causes said second piston to expand the air inside the second cylinder.

12. The dampened electronic control of claim 10, wherein the first and second pistons are located on opposite sides of the shaft and are equidistant from the shaft.

13. The dampened electronic control of claim 10, further comprising a plurality of springs provided separately to each of the first and second pistons, wherein the springs impart substantially equal and opposite forces upon the moveable element to thereby bias the moveable element towards a neutral position.

14. The dampened electronic control of claim 10, wherein the moveable element comprises a treadle.

15. The dampened electronic control of claim 10, wherein each of the first and second pistons comprises at least one sealing ring that slidably engages the inner walls of the first and second cylinders, respectively.

16. The dampened electronic control of claim 10, wherein each of the first and second pistons comprises a bore hole extending completely through the respective piston to provide fluid communication between air contained within the first and second cylinders and an exterior environment outside the housing.

17. The dampened electronic control of claim 10, further comprising a neutral detent mechanism that actively moves the movable element back towards a neutral position, wherein the neutral detent mechanism comprises a mechanism body secured to the housing and a cam plate secured to the movable element.

18. A dampened electronic control for manual operation to control a machine, comprising:
    a housing;
    a movable element pivotally supported in the housing upon a shaft with a rotation axis;
    an electronic sensor configured to detect rotational movement of the shaft; and a non-hydraulic damping mechanism coupled to the moveable element, the damping mechanism comprising:
  first and second pistons located on opposite sides of the shaft, each piston being disposed within first and second cylinders, respectively, of the housing and configured to operate with air inside the cylinder as the working fluid;
  a moveable connection provided between each piston and the moveable element so that a rotation of the moveable element about the rotation axis of shaft results in a vertical movement of each piston within the respective cylinder;
  a spring provided to each piston and adapted to resiliently bias said piston towards the moveable element,
  wherein movement of the moveable element towards the first piston causes said first piston to compress the air inside the first cylinder to thereby provide a resistance force against the moveable element to thereby dampen the movement of the moveable element; and
a neutral detent mechanism that actively moves the movable element back towards a neutral position, wherein the neutral detent mechanism comprises a mechanism body secured to the housing and a cam plate secured to the movable element,
wherein the mechanism body comprises a spring-biased cam follower pin that is received and seated in a concave cam surface of the cam plate, whereby as the cam plate rotates together with the moveable element, the cam follower pin is dislodged from the concave cam surface by a cam action face that engages with and presses upon the cam follower pin in opposition to a force applied by the spring of the cam follower pin.

* * * * *